(12) United States Patent
Miyada et al.

(10) Patent No.: US 12,142,002 B2
(45) Date of Patent: Nov. 12, 2024

(54) INFORMATION PROCESSING DEVICE, INFORMATION PROCESSING METHOD, AND PROGRAM

(71) Applicant: Sony Interactive Entertainment Inc., Tokyo (JP)

(72) Inventors: Naoyuki Miyada, Tokyo (JP); Masayoshi Mizuno, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 344 days.

(21) Appl. No.: 17/641,889

(22) PCT Filed: Sep. 20, 2019

(86) PCT No.: PCT/JP2019/037031
§ 371 (c)(1),
(2) Date: Mar. 10, 2022

(87) PCT Pub. No.: WO2021/053817
PCT Pub. Date: Mar. 25, 2021

(65) Prior Publication Data
US 2022/0327733 A1    Oct. 13, 2022

(51) Int. Cl.
*G06T 7/73*       (2017.01)
*G06V 40/20*      (2022.01)

(52) U.S. Cl.
CPC ............... *G06T 7/73* (2017.01); *G06V 40/23* (2022.01); *G06T 2207/20081* (2013.01)

(58) Field of Classification Search
CPC ............. G06T 7/73; G06T 2207/20081; G06T 2207/20084; G06T 2207/30196; G06T 7/75; G06V 40/23; G06V 10/82; G06V 40/103

See application file for complete search history.

(56) References Cited

U.S. PATENT DOCUMENTS

| 2014/0244344 A1 | 8/2014 | Bilet | |
| 2019/0228330 A1* | 7/2019 | Kaifosh | G06F 3/014 |
| 2022/0108468 A1* | 4/2022 | Nakamura | G06V 40/103 |

FOREIGN PATENT DOCUMENTS

| JP | 2012083955 A | 4/2012 |
| JP | 2014021816 A | 2/2014 |
| JP | 2017097577 A | 6/2017 |

OTHER PUBLICATIONS

International search report for corresponding PCT Application No. PCT/JP2019/037031, 2 pages, Dec. 3, 2019.

\* cited by examiner

*Primary Examiner* — John R Wallace
(74) *Attorney, Agent, or Firm* — Matthew B. Dernier, Esq.

(57) ABSTRACT

An information processing device is provided with a relation learning section that learns the relation between a first image of an object having a plurality of joints and coordinate information which indicates positions of the plurality of joints and which is defined in a range expanded to be larger than the angle of view of the first image, thereby constructing a trained model for estimating coordinate information of at least one joint located outside the angle of view of a newly-acquired second image of an object.

13 Claims, 7 Drawing Sheets

INFORMATION PROCESSING DEVICE, INFORMATION PROCESSING METHOD, AND PROGRAM

TECHNICAL FIELD

The present invention relates to an information processing device, an information processing method, and a program.

BACKGROUND ART

Various techniques have been proposed for estimating a posture of an object, such as an estimation method based on an image of the object, an estimation method based on output of sensors attached to the object, and an estimation method based on a knowledge model in the past. PTL 1 describes a motion model learning device using a total posture matrix and a partial posture matrix.

CITATION LIST

Patent Literature

[PTL 1] JP 2012-83955A

SUMMARY

Technical Problem

However, the conventional technique is based on the premise that the entire object is within an angle of view of an image pickup device. Therefore, it is difficult to deal with a case where the posture is estimated with respect to an image generated to have a composition in which a part of the object is located outside the angle of view, for example.

An object of the present invention is to provide an information processing device, an information processing method, and a program which are capable of performing posture estimation based on an image even in the case where a part of the object is located outside the angle of view of the image.

Solution to Problem

According to an aspect of the invention, provided is an information processing device including a relation learning section that learns a relation between a first image of an object having a plurality of joints and coordinate information which indicates positions of the plurality of joints and which is defined in a range expanded to be larger than an angle of view of the first image so as to construct a trained model that estimates coordinate information of at least one joint located outside an angle of view of a newly acquired second image of the object.

According to another aspect of the invention, provided is an information processing device including a coordinate estimating section that estimates the coordinate information of at least one joint located outside the angle of view of a newly acquired second image of an object on the basis of a trained model constructed by learning the relation between a first image of the object having a plurality of joints and coordinate information which indicates positions of the plurality of joints and which is defined in a range expanded to be larger than the angle of view of the first image.

According to yet another aspect of the present invention, provided is an information processing method including a step of constructing a trained model that estimates the coordinate information of at least one joint located outside the angle of view of a newly acquired second image of an object by learning the relation between a first image of the object having a plurality of joints and coordinate information which indicates positions of the plurality of joints and which is defined in a range expanded to be larger than the angle of view of the first image, and a step of estimating the coordinate information of at least one joint located outside the angle of view of the second image on the basis of the trained model.

According to yet another aspect of the present invention, provided is a program causing a computer to implement a function of constructing a trained model for estimating the coordinate information of at least one joint located outside the angle of view of a newly acquired second image of an object by learning the relation between a first image of the object having a plurality of joints and coordinate information which indicates positions of the plurality of joints and which is defined in a range expanded to be larger than the angle of view of the first image.

According to yet another aspect of the present invention, provided is a program causing a computer to implement a function of estimating the coordinate information of at least one joint located outside the angle of view of a newly acquired second image of an object on the basis of a trained model constructed by learning the relation between a first image of the object having a plurality of joints and coordinate information which indicates positions of the plurality of joints and which is defined in a range expanded to be larger than the angle of view of the first image.

BRIEF DESCRIPTION OF DRAWINGS

FIG. 4 depicts diagrams for illustrating another example of estimating the coordinates of joints in the example of FIG. 1.

DESCRIPTION OF EMBODIMENT

Hereinafter, some embodiments of the present invention will be described in detail with reference to the accompanying drawings. It should be noted that, in the present specification and the drawings, components having substantially the same functional configuration are designated by the same reference numerals, so that duplicate description will be omitted.

Figure 1:
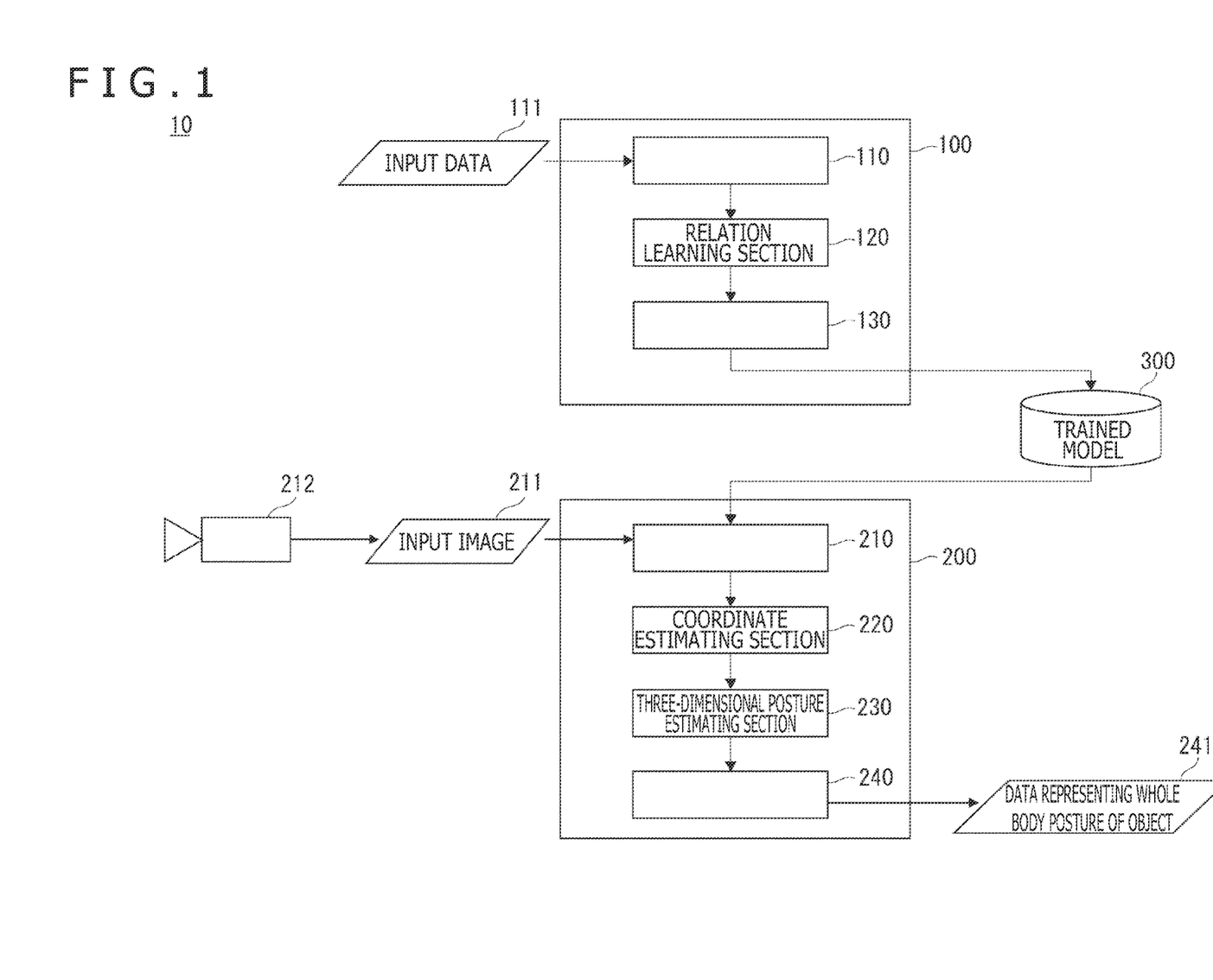
FIG. 1 is a block diagram illustrating a schematic configuration of a system including information processing devices according to an embodiment of the present invention.

FIG. 1 is a block diagram illustrating a schematic configuration of a system including information processing devices according to an embodiment of the present invention. In the illustrated example, a system 10 includes information processing devices 100 and 200. The information processing devices 100 and 200 are each connected to a wired or wireless network and a trained model 300 constructed by the information processing device 100 and stored in a storage on the network is read by the information processing device 200, for example.

The information processing devices 100 and 200 are implemented by a computer having a communication interface, processor, and memory, for example. In the information processing devices 100 and 200, the functions of respective sections as described below are fulfilled in terms of software by the processor operating according to the program stored in the memory or received via the communication interface.

The information processing device 100 includes an input section 110, a relation learning section 120, and an output section 130. By using the trained model 300 constructed by the information processing device 100, the information processing device 200, which will be described later, executes estimation processing based on the image of the object, so that the coordinates of the joints of the object can be estimated in a region including a portion outside the angle of view of the image pickup device.

The input section 110 receives an input of input data 111 to be used for learning carried out by the relation learning section 120. In the present embodiment, the input data 111 includes an image of an object having a plurality of joints and joint coordinate information of the object in the image.

Figure 2:
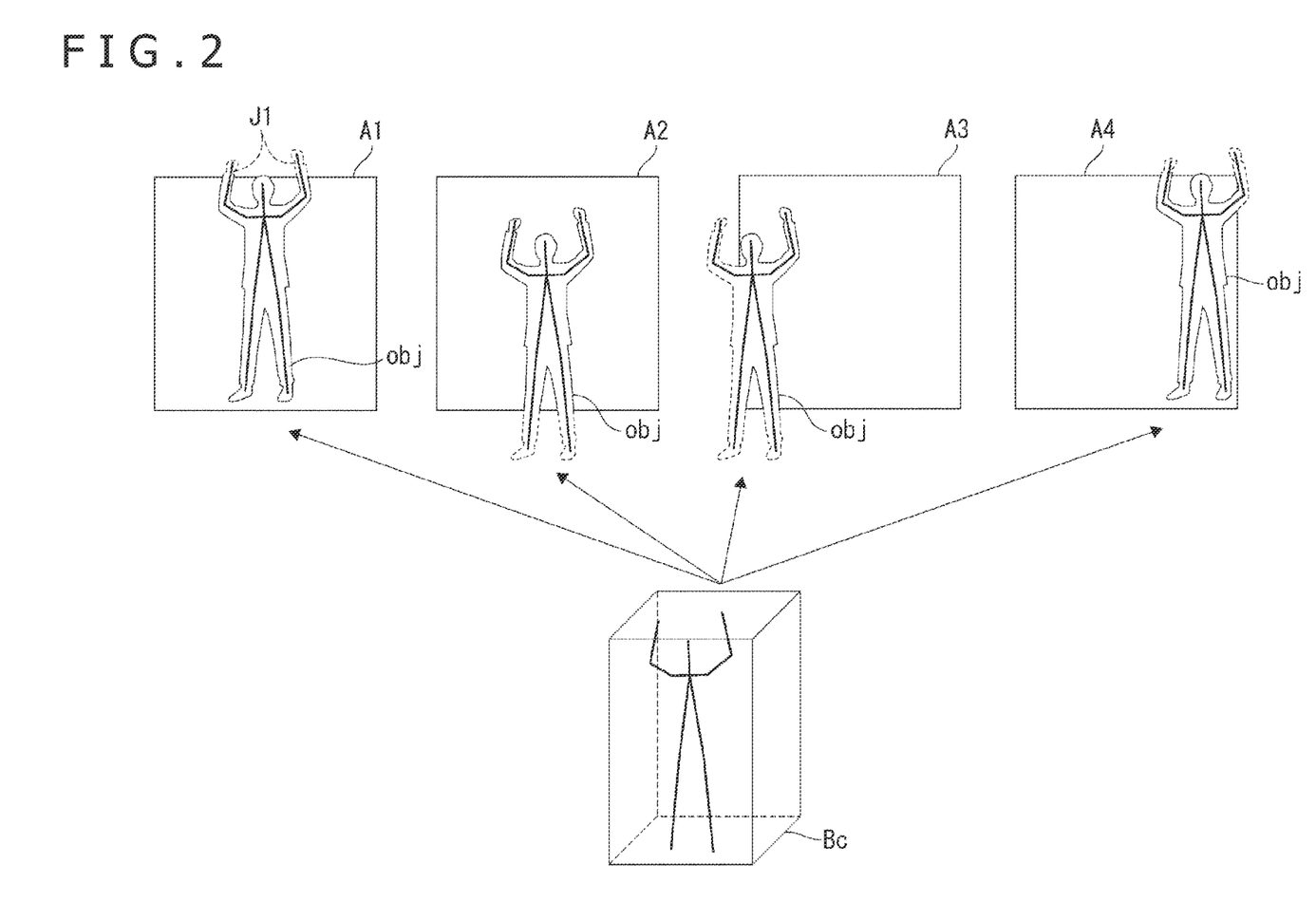
FIG. 2 is a diagram illustrating input data in the example of FIG. 1.

FIG. 2 is a diagram illustrating the input data 111 in the example of FIG. 1. In the present embodiment, the input data 111 includes an image generated to have a composition in which a part of an object obj is located outside the angle of view, as illustrated as images A1 to A4 in FIG. 2. In the images A1 to A4, the portion of the profile line of the object obj that is included in the angle of view is indicated by a solid line, and the portion located outside the angle of view is indicated by a broken line. Further, the solid line illustrating the posture of the object obj indicates respective joints of the object obj and their mutual relation.

In addition to this, the input data 111 may include an image generated to have a composition in which the entire object is located within the angle of view. The image may be a two-dimensional image generated by an RGB (Red-Green-Blue) sensor or the like, or may be a three-dimensional image generated by an RGB-D sensor or the like.

Further, the input data 111 includes coordinate information indicating the positions of a plurality of joints of the object, as illustrated as joint coordinate information Bc in FIG. 2. In the present embodiment, since the joint coordinate information Bc is defined in a range expanded to be larger than the angle of view of the image, the input data 111 includes the images A1 to A4 each generated to have a composition in which a part of the object obj is located outside the angle of view, and the joint coordinate information Bc indicating the positions of all the joints of the object obj in the images A1 to A4.

For example, in the case of the image A1, joints J1 of both wrists are located outside the angle of view of the image, but the input data 111 includes the image A1 and the joint coordinate information Bc including the coordinate information of each joint located within the angle of view of the image A1 and the joints J1 of both wrists.

Here, in the present embodiment, the joint coordinate information Bc as illustrated in FIG. 2 is input based on the three-dimensional posture data independent of the images A1 to A4. Such three-dimensional posture data is obtained by, for example, images taken by a plurality of cameras different from the camera that captures the images A1 to A4, motion capture using IMU (Inertial Measurement Unit) sensors attached to the object obj, or the like. Incidentally, regarding the acquisition of such three-dimensional posture data, detailed description thereof will be omitted because various known techniques can be used.

With reference to FIG. 1 again, the relation learning section 120 of the information processing device 100 learns the relation between the image and the joint coordinate information input via the input section 110 to construct the trained model 300. In the present embodiment, the relation learning section 120 constructs the trained model 300 by executing supervised learning using an image and joint coordinate information input via the input section 110 as input data and using three-dimensional posture data as correct answer data, for example. Incidentally, as for the specific method of machine learning, detailed description thereof will be omitted because various known techniques can be used. The relation learning section 120 outputs the parameters of the constructed trained model 300 via the output section 130.

The information processing device 200 includes an input section 210, a coordinate estimating section 220, a three-dimensional posture estimating section 230, and an output section 240. The information processing device 200 executes estimation processing based on the image of the object by using the trained model 300 constructed by the information processing device 100, so as to estimate the coordinates of the joints of the object in a region including a portion outside the angle of view of the image pickup device.

The input section 210 receives the input of an input image 211 to be used for the estimation by the coordinate estimating section 220. The input image 211 is an image newly acquired by an image pickup device 212, for example. The input image 211 is an image of the object obj having a plurality of joints as described above with reference to FIG. 2. Note that the object of the image of the input data 111 and the object of the input image 211 have the same joint structure, but they do not necessarily have to be the same object. To be specific, for example, in the case where the object of the image of the input data 111 is a human, the object of the input image 211 is also a human, but the objects do not have to be the same person.

Further, the input image 211 is not limited to the image acquired by the image pickup device 212. For example, an image stored in a storage device connected to the information processing device 200 by wire or wirelessly may be input via the input section 210 as the input image 211. Further, the image acquired from the network may be input via the input section 210 as the input image 211. Still further, the input image 211 may be a still image or a moving image.

The coordinate estimating section 220 estimates the coordinates of a plurality of joints of the object from the input image 211 input via the input section 210 on the basis of the trained model 300. As described above, since the trained model 300 is constructed based on the coordinate information of the joints defined in a range expanded to be larger than the angle of view of the image, an inference regarding the positions of respective joints and the link structure between those joints can be made even in the region outside the angle of view of the input image 211. As a result, the coordinate estimating section 220 can estimate that "the joint does not exist within the angle of view of the image input to the input section 210, but exists at the coordinates (X, Y, Z) outside the angle of view." Further, the coordinate estimating section 220 can also estimate the positional relation of the plurality of joints on the basis of the estimated coordinates of the plurality of joints.

Figure 3:
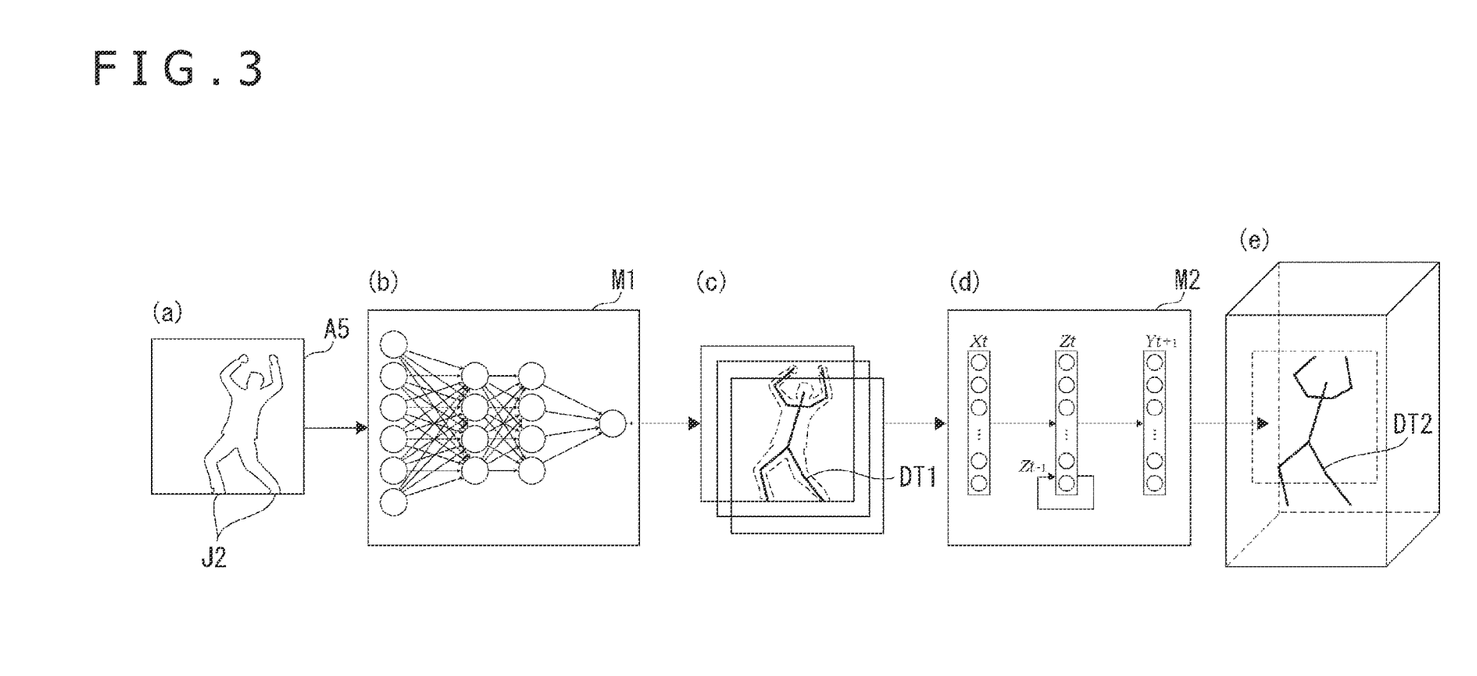
FIG. 3 depicts diagrams for illustrating an example of estimating coordinates of joints in the example of FIG. 1.

FIG. 3 depicts diagrams for illustrating an example of estimating the coordinates of joints in the example of FIG. 1. In the present embodiment, the trained model 300 includes a first trained model M1 that estimates the coordinates of the joints located within the angle of view from the image and a second trained model M2 that estimates the coordinates of at least one joint located outside the angle of view from the information regarding the coordinates of the joints located within the angle of view. The coordinate estimating section 220 executes a two-step estimation process using the first trained model M1 and the second trained model M2.

Here, in the example illustrated in (a) of FIG. 3, the input image 211 includes an image A5 in which joints J2 of both ankles are located outside the angle of view. The first trained model M1 illustrated in (b) of FIG. 3 is a trained model based on a CNN (Convolutional Neural Network). The coordinate estimating section 220 estimates the coordinates of the joints located within the angle of view of the image A5, that is, the joints excluding the joints J2 of both ankles, using the first trained model M1. As a result, intermediate data DT1 that identifies the coordinates of the joints located within the angle of view of the image can be obtained.

Further, as illustrated in (c) of FIG. 3, the coordinate estimating section 220 uses the intermediate data DT1 to execute an estimation process using the second trained model M2. The second trained model M2 illustrated in (d) of FIG. 3 is a trained model based on an RNN (Recurrent Neural Network), and can estimate, from the intermediate data DT1, the coordinates of the joints outside the angle of view and not included in the intermediate data DT1, namely the coordinates of the joints J2 of both ankles in this example.

Further, in the illustrated example, the intermediate data DT1 is data expressing the coordinates of the joints as two-dimensional coordinates, but the second trained model M2 can estimate the coordinates of the joints as three-dimensional coordinates by input of the time-series intermediate data DT1 as illustrated in (e) of FIG. 3. As illustrated in (e) of FIG. 3, final data DT2 obtained by estimation using the second trained model M2 includes the estimation results of the coordinates of all joints of the object including joints J2 of both ankles located outside the angle of view of the image A5 illustrated in (a) of FIG. 3.

With reference to FIG. 1 again, the three-dimensional posture estimating section 230 of the information processing device 200 estimates the whole body posture of the object on the basis of the coordinates of the joints estimated by the coordinate estimating section 220. The three-dimensional posture estimating section 230 outputs data 241 representing the estimated whole body posture of the object via the output section 240. For example, the data 241 representing the whole body posture of the object may be displayed on a display as an expanded image of the input image 211. For example, the data 241 representing the whole body posture of the object may be output as the movement in the image of the user's avatar that imitates the posture of the object, or the image of the character in a game, a moving image, or the like. Alternatively, with or instead of the output on the display, the data 241 representing the whole body posture of the object may be output as the movement of a robot that imitates the posture of the object.

According to the configuration of the present embodiment as described above, the coordinates of a plurality of joints including at least one joint located outside the angle of view of the image input to the input section 210 are estimated based on the trained model 300 constructed by learning the relation between an image of the object having a plurality of joints and the coordinate information of the joints defined in a range expanded to be larger than the angle of view of the image. Therefore, even in the case where a part of the object is located outside the angle of view of the image, the posture of the object can be estimated based on the image.

FIG. 4 depicts diagrams for illustrating another example of estimating the coordinates of the joint in the example of FIG. 1. In the example of FIG. 4, the trained model 300 includes the first trained model M1 similar to the example of FIG. 3 and a group of trained models constructed for respective joints (a third trained model M3, a fourth trained model M4, and a fifth trained model M5).

In the examples illustrated in (a) and (b) of FIG. 4, similarly to (a) and (b) of FIG. 3, the coordinate estimating section 220 uses the first trained model M1 to estimate the coordinates of the joints located inside the angle of view of the image A5, namely, the joints excluding the joints J2 of both ankles. As a result, the intermediate data DT1 that identifies the coordinates of the joints located within the angle of view of the image can be obtained.

Next, as illustrated in (c) of FIG. 4, the coordinate estimating section 220 uses the intermediate data DT1 to execute estimation processing using the third trained model M3 to the fifth trained model M5.

The third trained model M3 to the fifth trained model M5 illustrated in (d) of FIG. 4 are trained models based on an RNN (Recurrent Neural Network) similar to the second trained model M2 illustrated in FIG. 3. However, the third trained model M3 to the fifth trained model M5 illustrated in (d) of FIG. 4 are trained models constructed in a limited manner for estimating the coordinates of a single joint (or a set of joints). For example, the third trained model M3 is a trained model constructed in a limited manner for estimating the coordinates of the joints of both ankles. In this case, the coordinate estimating section 220 can estimate the coordinates of the joints J2 of both ankles from the intermediate data DT1 by using the third trained model M3. In the case where there are other joints located outside the angle of view, estimation using the fourth trained model M4 or the fifth trained model M5 are performed in parallel, and the estimation results may be combined.

It should be noted that also in the example of FIG. 4, the intermediate data DT1 is data expressing the coordinates of the joints as two-dimensional coordinates similarly to the example of FIG. 3, but the third trained model M3 to the fifth trained model M5 can estimate the coordinates of the joints as three-dimensional coordinates as illustrated in (e) of FIG. 4, by input of the time-series intermediate data DT1. As illustrated in (e) of FIG. 4, final data DT3 obtained by estimation using the third trained model M3 to the fifth trained model M5 includes the estimation results of the coordinates of all joints of the object including the joints J2 of both ankles located outside the angle of view of the image A5 illustrated in (a) of FIG. 4.

According to another example of joint coordinate estimation illustrated in FIG. 4, the coordinates of the joint are estimated by using different trained models, depending on which joint is located outside the angle of view of the image. It can be expected that the size of each model will be reduced and the processing load will be reduced by constructing each of trained models (in the case of the above example, the third trained model M3, the fourth trained model M4, and the fifth trained model M5) that estimates the coordinates of a single joint (or a set of joints) in a limited manner.

Further, regarding a limited request such as "estimate only the position of the face," for example, the result can be obtained with the minimum processing load.

Figure 5:
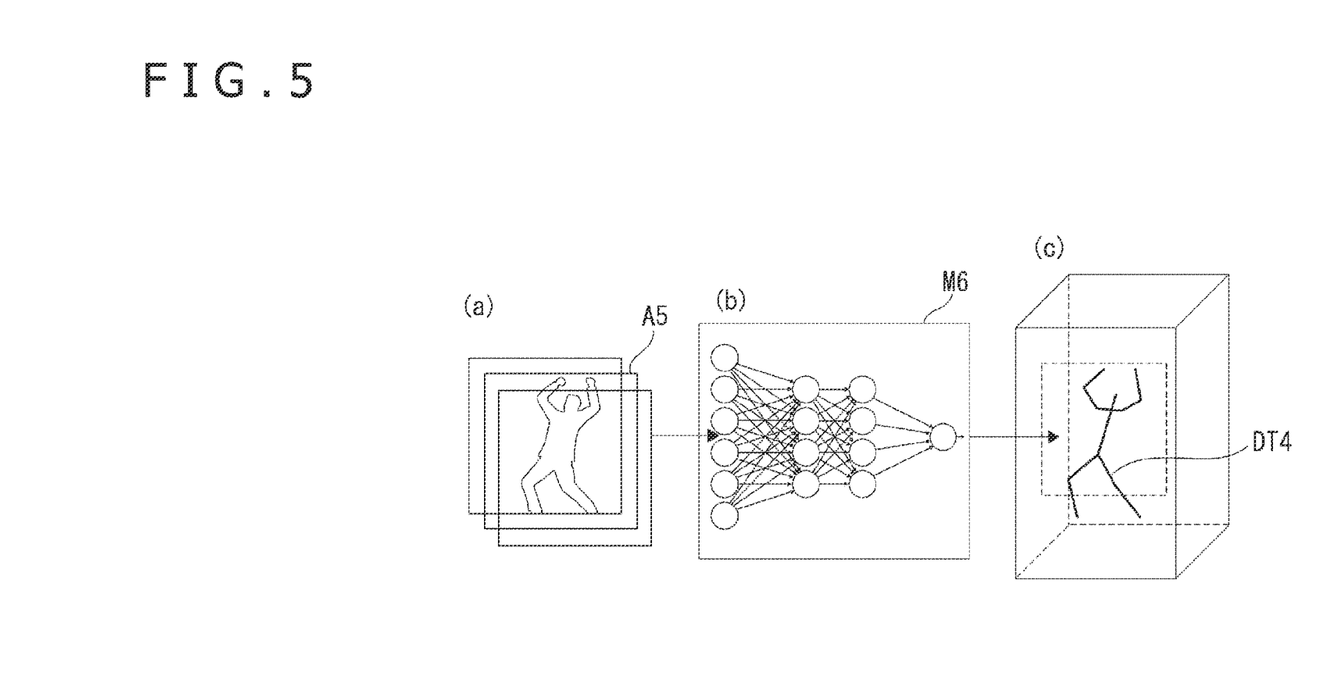
FIG. 5 depicts diagrams for illustrating yet another example of estimating the coordinates of joints in the example of FIG. 1.

FIG. 5 depicts diagrams for illustrating yet another example of estimating the coordinates of the joint in the example of FIG. 1. In the example of FIG. 5, the trained model 300 is a trained model having a function of collectively executing two-step estimation processing by the first trained model M1 and second trained model M2 illustrated in FIG. 3, and includes a sixth trained model M6 that estimates the coordinates of the joints of the object including those located outside the angle of view from time-series input images 211. The coordinate estimating section 220 executes the estimation process by using the sixth trained model M6.

In the example illustrated in (a) of FIG. 5, the input image 211 includes the image A5 in which the joints J2 of both ankles are located outside the angle of view, as in the example of (a) of FIG. 3. In the illustrated example, the input image 211 is basically a two-dimensional image, but the sixth trained model M6 can estimate the coordinates of the joints as three-dimensional coordinates as illustrated in (c) of FIG. 5 by input of the time-series input images 211. The sixth trained model M6 illustrated in (b) of FIG. 5 is a trained model obtained by adding a time controlling element such as the second trained model M2 illustrated in (d) of FIG. 3 to the first trained model M1 illustrated in (b) of FIG. 3. The coordinate estimating section 220 estimates the coordinates of the joints located within and outside the angle of view of the image A5, that is, all joints including the joints J2 of both ankles, by using the sixth trained model M6.

As a result, as illustrated in (c) of FIG. 5, final data DT4 obtained by estimation using the sixth trained model M6 includes the estimation results of the coordinates of all joints of the object including the joints J2 of both ankles located outside the angle of view of the image A5 illustrated in (a) of FIG. 5.

Note that in the above-described embodiment of the present invention, the construction of the trained model 300 by the information processing device 100 and the estimation of the whole body posture of the object by the information processing device 200 may be performed independently. For example, the trained model 300 may be constructed by the information processing device 100 in advance, and any information processing device 200 may estimate the whole body posture of the object on the basis of the trained model 300. Further, for example, the information processing device 100 and the information processing device 200 may be mounted as a single computer that can be connected to the trained model 300.

Further, in the embodiment of the present invention, the functions described as being implemented in the information processing device 100 and the information processing device 200 may be implemented in the server. For example, the image generated by the image pickup device is transmitted from the information processing device to the server, and the server can estimate the whole body posture of the object.

Further, the trained model 300 of the embodiment of the present invention may be a model that estimates the positions of all joints of the object, or may be a model that estimates only the positions of some joints. Further, the coordinate estimating section 220 of the present embodiment may estimate the positions of all joints of the object, or may estimate only the positions of some joints. In addition, the three-dimensional posture estimating section 230 of the present embodiment may estimate the three-dimensional posture of the whole body of the object, or may estimate only a part of the three-dimensional posture such as only the upper body.

Still further, in the embodiment of the present invention, a person is exemplified as an object, but the present invention is not limited to this example. For example, any object having a plurality of joints, such as an animal or a robot, can be a candidate. The information processing device 200 in the present embodiment can be used for robot motion control by being mounted on a robot, for example. Further, the information processing device 200 according to the present embodiment can be used for monitoring a suspicious person by being mounted on a surveillance camera device, for example.

Figure 6:
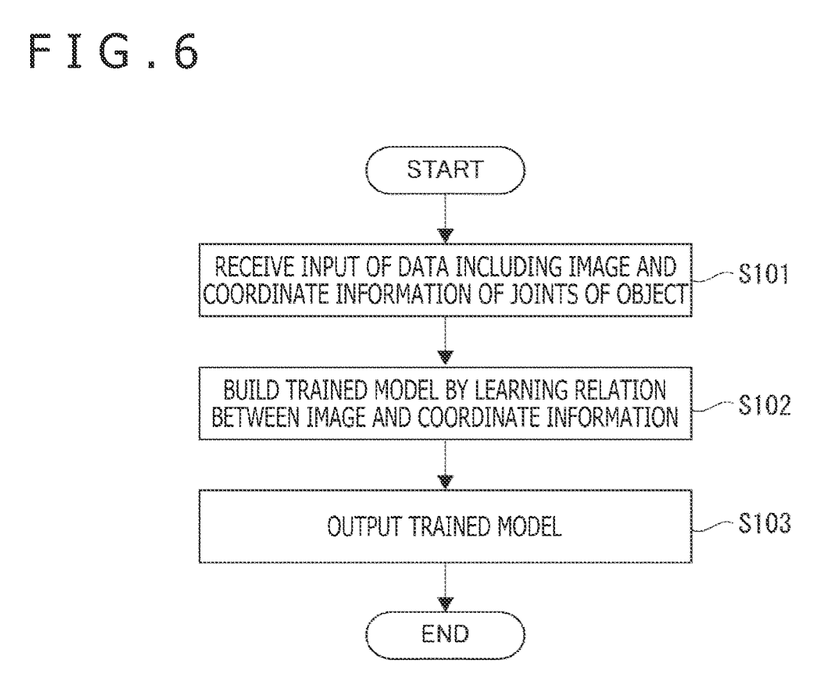
FIG. 6 is a flowchart illustrating an example of processing according to the embodiment of the present invention.
Figure 7:
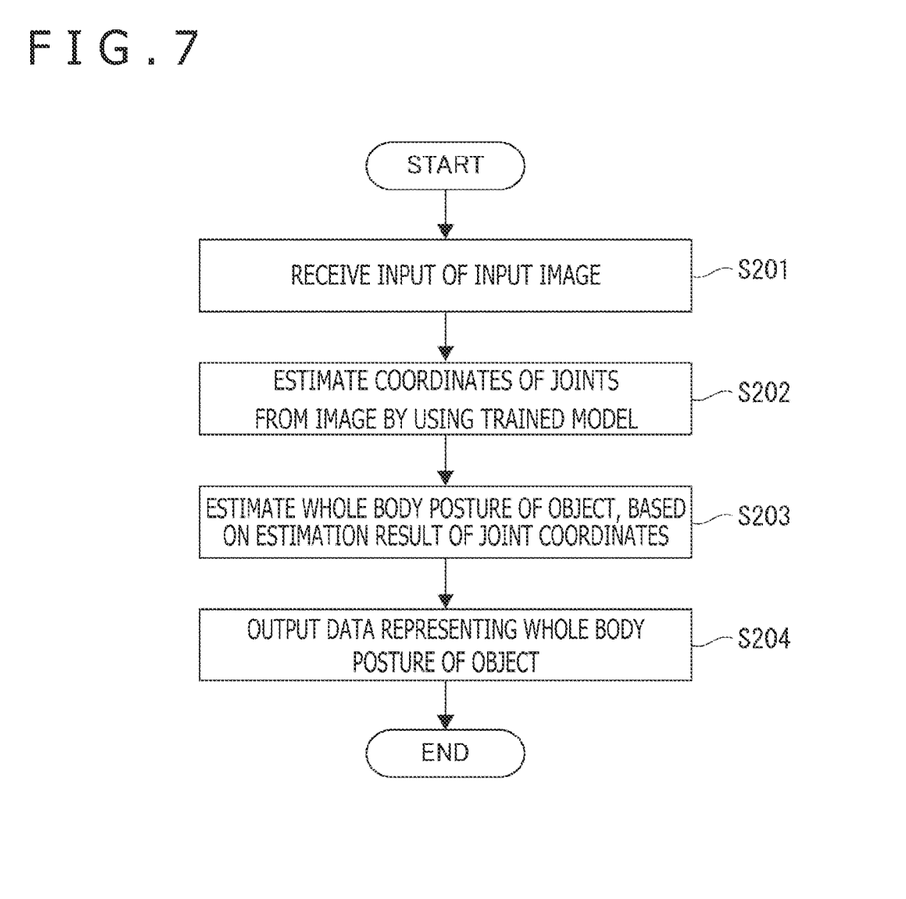
FIG. 7 is another flowchart illustrating an example of processing according to the embodiment of the present invention.

FIGS. 6 and 7 are flowcharts illustrating an example of processing according to the embodiment of the present invention.

FIG. 6 illustrates the process until the information processing device 100 builds the trained model 300. First, the input section 110 of the information processing device 100 receives the input data 111 to be used for learning performed by the relation learning section 120, that is, the input of data including an image and the coordinate information of the joints of the object (step S101). Here, since the joint coordinate information is defined in a range expanded to be larger than the angle of view of the image, even for an image in which some joints of the object are located outside the angle of view, the input data 111 contains the image and the coordinate information of all the joints including the joints located outside. Next, the relation learning section 120 builds the trained model 300 by learning the relation between the image and the coordinate information in the input data 111 (step S102). In the information processing device 100, the output section 130 outputs the trained model 300 constructed in a storage on the network, specifically the parameters of the trained model 300, for example (step S103).

On the other hand, FIG. 7 illustrates a process in which the information processing device 200 estimates the coordinates of the joints from an image by using the trained model 300. When the input section 210 of the information processing device 200 receives the input of a new input image 211 (step S201), the coordinate estimating section 220 estimates the coordinates of the joints from the image using the trained model 300 (step S202). Further, the three-dimensional posture estimating section 230 estimates the whole body posture of the object on the basis of the estimation result of the joint coordinates made by the coordinate estimating section 220 (step S203). In the information processing device 200, the output section 240 outputs data representing the estimated whole body posture of the object (step S204).

Although some embodiments of the present invention have been described in the above in detail with reference to the accompanying drawings, the present invention is not limited to such examples. It is clear that a person having ordinary knowledge in the field of technology to which the present invention belongs can come up with various modifications or alterations within the scope of the technical ideas described in the claims, and thus it is naturally understood that these also belong to the technical scope of the present invention.

REFERENCE SIGNS LIST

10: System
100, 200: Information processing device 110, 210: Input section
111: Input data
120: Relation learning section
130, 240: Output section
211: Input image
212: Image pickup device
220: Coordinate estimating section
230: Three-dimensional posture estimating section
300: Trained model

The invention claimed is:

1. An information processing device comprising:
a relation learning section that learns a relation between a first image of an object having a plurality of joints and coordinate information which indicates positions of the plurality of joints and which is defined in a range expanded to be larger than an angle of view of the first image so as to construct a plurality of trained models that each estimates coordinate information of at least one joint located outside an angle of view of a newly acquired second image of the object; wherein
the joint coordinates are estimated by using different trained models depending on which joint is located outside the angle of view of the second image.

2. The information processing device according to claim 1, wherein
the relation learning section constructs the trained model that estimates the coordinate information of the plurality of joints including the at least one joint.

3. The information processing device according to claim 1, wherein the relation learning section learns the relation between a plurality of the first images acquired in time series and the coordinate information of the plurality of the first images so as to construct the trained model that estimates three-dimensional coordinate information of the plurality of joints in the second image.

4. The information processing device according to claim 1, wherein
the plurality of joints include a first joint and a second joint, and
the trained model includes a first trained model that estimates coordinate information of the first joint when the first joint is located outside the angle of view of the second image, and includes a second trained model that estimates coordinate information of the second joint when the second joint is located outside the angle of view of the second image.

5. The information processing device according to claim 1, wherein the trained model includes a third trained model that estimates coordinate information of a joint located within the angle of view of the second image and a fourth trained model that estimates the coordinate information of the at least one joint located outside the angle of view of the second image.

6. An information processing device comprising:
a coordinate estimating section that estimates coordinate information of at least one joint located outside an angle of view of a newly acquired second image of an object, based on a plurality of trained models constructed by learning a relation between a first image of the object having a plurality of joints and coordinate information which indicates positions of the plurality of joints and which is defined in a range expanded to be larger than an angle of view of the first image; wherein
the joint coordinates are estimated by using different trained models depending on which joint is located outside the angle of view of the second image.

7. The information processing device according to claim 6, wherein the coordinate estimating section estimates the coordinate information of the plurality of joints including the at least one joint.

8. The information processing device according to claim 6, wherein
the second image includes a plurality of images acquired in time series, and
the coordinate estimating section estimates three-dimensional coordinate information of the plurality of joints.

9. The information processing device according to claim 6, wherein
the plurality of joints include a first joint and a second joint,
the plurality of trained models includes a first trained model useful for estimating coordinate information of the first joint when the first joint is located outside the angle of view of the second image and a second trained model useful for estimating coordinate information of the second joint when the second joint is located outside the angle of view of the second image, and
the coordinate estimating section estimates the coordinate information of the first joint, based on the first trained model, when the first joint is located outside the angle of view of the second image, and estimates the coordinate information of the second joint, based on the second trained model, when the second joint is located outside the angle of view of the second image.

10. The information processing device according to claim 6, wherein
the plurality of trained models includes a third trained model useful for estimating coordinate information of a joint located within the angle of view of the second image and a fourth trained model useful for estimating the coordinate information of the at least one joint located outside the angle of view of the second image, and
the coordinate estimating section estimates the coordinate information of the joint located within the angle of view of the second image, based on the third trained model, and estimates the coordinate information of the at least one joint located outside the angle of view of the second image, based on the fourth trained model.

11. A method for processing information comprising:
constructing a plurality of trained models that each estimates coordinate information of at least one joint located outside an angle of view of a newly acquired second image of an object by learning a relation between a first image of the object having a plurality of joints and coordinate information which indicates positions of the plurality of joints and which is defined in a range expanded to be larger than an angle of view of the first image; and
estimating the coordinate information of the at least one joint located outside the angle of view of the second image, based on the trained model; wherein
the joint coordinates are estimated by using different trained models depending on which joint is located outside the angle of view of the second image.

12. A non-transitory, computer readable storage medium containing a program, which when executed by a computer, causes the computer to carry out a method for processing information by carrying out actions, comprising:
constructing a plurality of trained models each for estimating coordinate information of at least one joint located outside an angle of view of a newly acquired second image of an object by learning a relation between a first image of the object having a plurality of joints and coordinate information which indicates positions of the plurality of joints and which is defined in a range expanded to be larger than an angle of view of the first image; wherein the joint coordinates are estimated by using different trained models depending on which joint is located outside the angle of view of the second image.

13. A non-transitory, computer readable storage medium containing a program, which when executed by a computer, causes the computer to carry out a method for processing information by carrying out actions, comprising:

estimating coordinate information of at least one joint located outside an angle of view of a newly acquired second image of an object, based on a plurality of trained models constructed by learning a relation between a first image of the object having a plurality of joints and coordinate information which indicates positions of the plurality of joints and which is defined in a range expanded to be larger than an angle of view of the first image; wherein the joint coordinates are estimated by using different trained models depending on which joint is located outside the angle of view of the second image.

* * * * *